April 18, 1944.  W. S. HOWELL  2,347,106
TRUCK TRAILER
Filed June 19, 1942  3 Sheets—Sheet 2

Inventor
William S. Howell,

By Clarence A. O'Brien
and Harvey B. Jacobson
Attorneys

April 18, 1944.  W. S. HOWELL  2,347,106
TRUCK TRAILER
Filed June 19, 1942  3 Sheets-Sheet 3
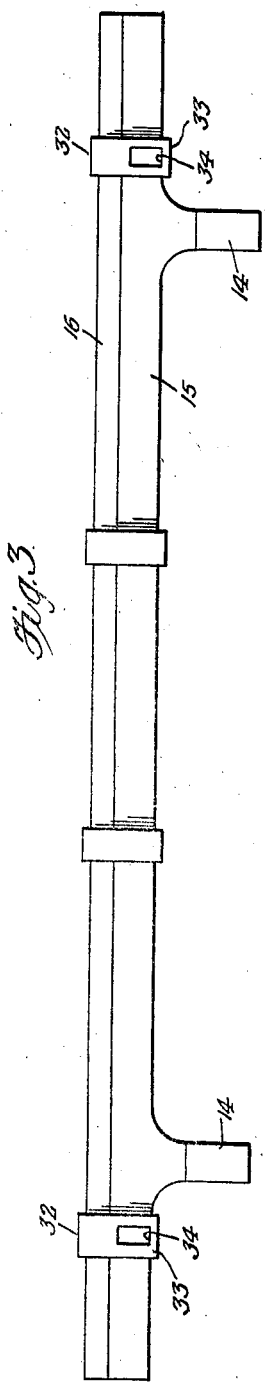
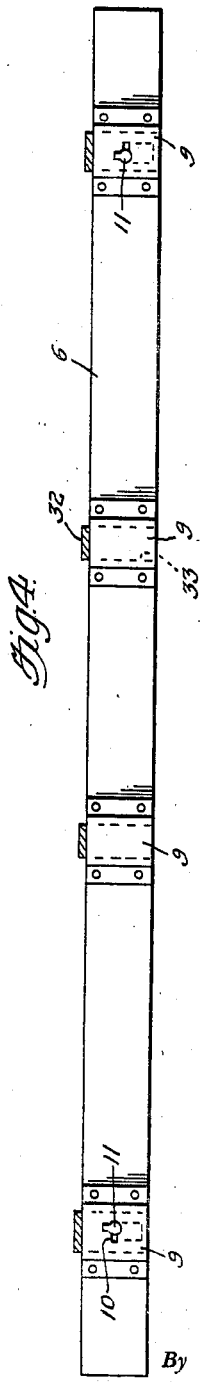
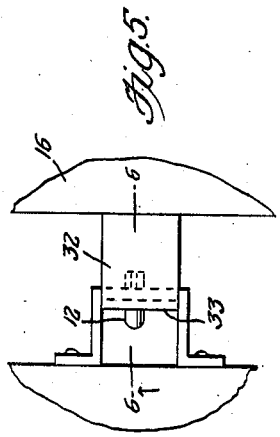
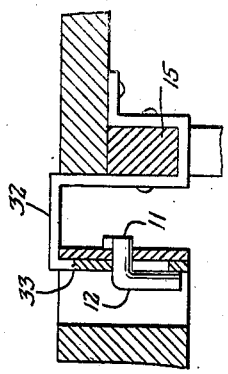
Inventor
William S. Howell.
By Clarence A. O'Brien
and Harvey B. Jacobson
Attorneys Patented Apr. 18, 1944

2,347,106

UNITED STATES PATENT OFFICE 2,347,106

TRUCK TRAILER

William S. Howell, Lafayette, N. J.

Application June 19, 1942, Serial No. 447,685

1 Claim. (Cl. 280—33.4)

This invention relates to new and useful improvements in land vehicles and more particularly to a trailer for use as a supplement to truck bodies.

At present, small farms generally have a light weight truck which for ordinary purposes is quite sufficient. However, when corn, hay and other substantial masses are to be moved, a larger capacity vehicle is necessary.

It is, therefore, the principal object of the present invention to provide an attachment for truck bodies which will serve substantially as a trailer, without necessitating any modification of the conventional truck body.

Other objects and advantages of the invention will become apparent to the reader of the following description.

In the drawings—

Figure 3 is a front elevational view of the coupling structure and bed of the trailer.

Figure 4 is a section on the line 4—4 of Figure 1.

Figure 5 is a fragmentary top plan view showing one of the connections between the trailer and truck body.

Figure 6 is a fragmentary detailed sectional view showing one of the key equipped connections between the trailer and the truck body.

Figure 7 is a perspective view of one of the coupling keys.

Figure 1:
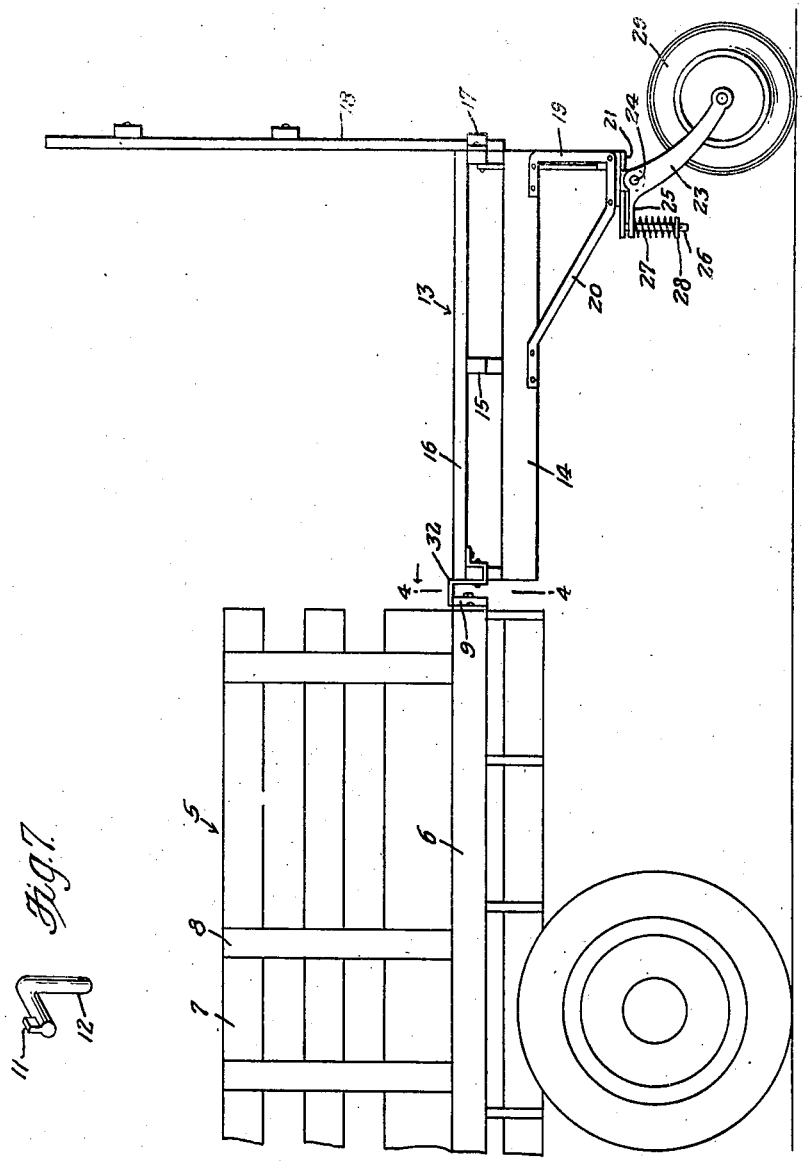
Figure 1 represents a fragmentary side elevational view showing the trailer.
Figure 2:
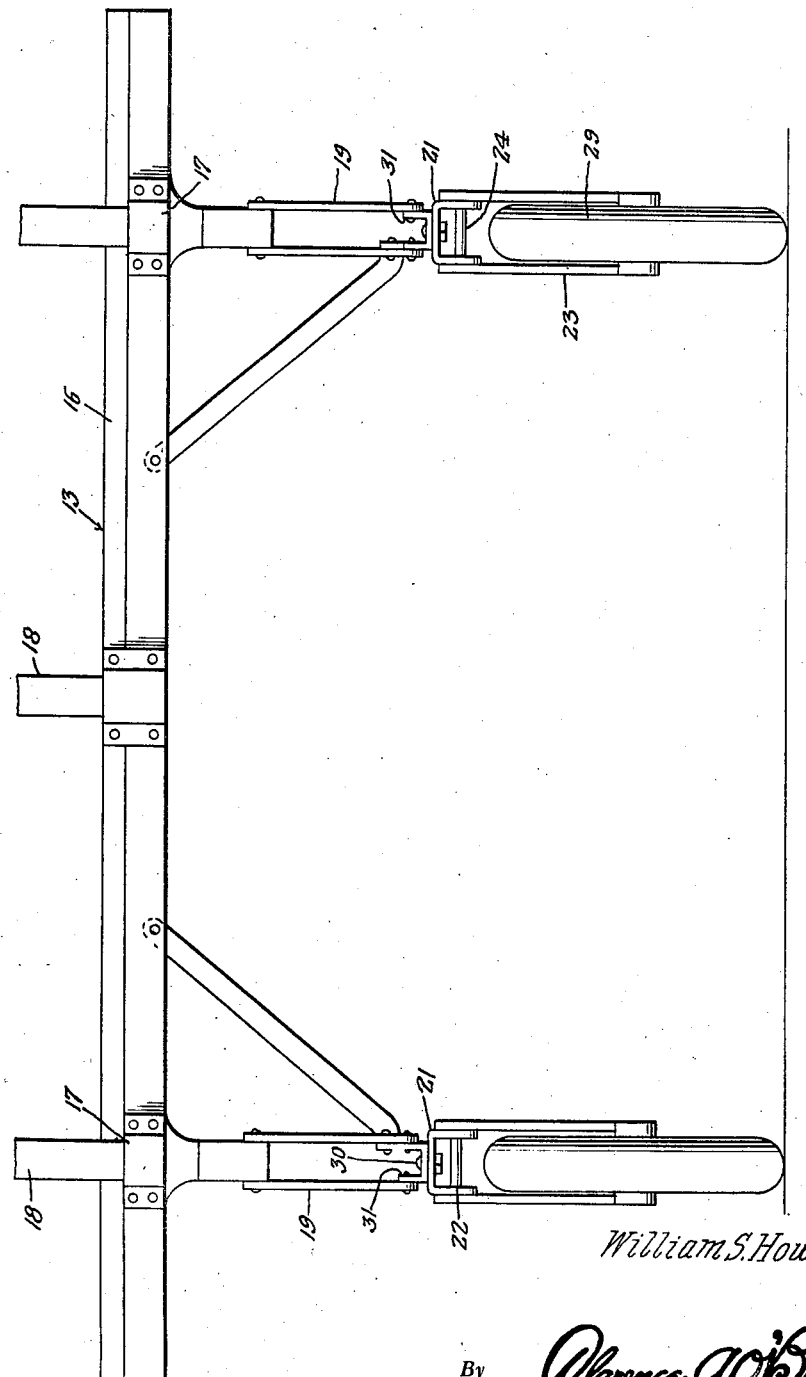
Figure 2 is a fragmentary rear elevational view of the trailer.

Referring to the drawings wherein like numerals designate like parts, it can be seen that numeral 5 generally refers to a conventional truck having a bottom 6, and sides 7 which sides are equipped with stakes 8 adapted to be set in the usual sockets (not shown).

This type of truck has sockets 9 at the rear of its bottom 6 for the accommodation of a staked rear wall (not shown).

To accommodate the present invention, the end sockets 9 have keyhole-shaped openings 10 therein to accommodate the lugged ends 11 of L-shaped keys 12.

Numeral 13 generally refers to the trailer and this comprises a bed 14, on which are bolsters 15 and a trailer bottom 16 is secured on the bolsters 15. The rearmost bolster 15 has sockets 17 thereon for receiving the stake ends of an elevated rear wall 18.

Leg structures 19 depend from the bed 14 and these are braced by suitable means 20. The leg structures 19 support plates 21 which are provided with ears 22 depending therefrom.

For each of the leg structures 19, there is a wheel fork 23 having ear portions through which a hinge pin 24 is disposed, this hinge pin also passing through the ears 22. Each of the forks 23 has a forwardly projecting finger 25, underlying the forward end portion of the corresponding plate 21 and as is shown in Figure 1, a pin 26 depends from the adjacent end of the plate 21 and through an opening in the finger 25, and this pin has a compression spring 27 thereon interposed between the lower portion of the finger 25 and a washer 28 on the lower portion of the pin.

As shown in Figure 1, each wheel 29 is mounted in the fork 23 and it can be seen that the spring 27 serves as a shock absorber for the load imposed.

It can also be seen, that the plate 21 is swivelly connected as at 30 to a channeled member 31 fixed to the leg structure 19, this for the purpose of permitting the wheels 29 to caster as the trailer is pulled around curves or corners in a road.

The forwardmost bolster 15 of the trailer 13 has hook members 32 secured thereto, each having a depending portion 33 for disposition to the corresponding stake socket 9 on the truck 5.

As can be seen in Figure 3, each of the end hook portions 33 has an opening 34 therein through which the depending leg portion of the corresponding key 12 can readily be disposed as will be apparent from an observation of Figure 6. The lugged end of the key is, of course, disposed through the keyhole 10 in the manner clearly shown in Figures 4 and 6 in order that the trailer is securely locked to the truck body.

Obviously, this form of connection permits ready detachability as well as attachability.

While the foregoing specification sets forth the invention in specific terms, it is to be understood that numerous changes in the shape, size and materials may be resorted to without departing from the spirit and scope of the invention as claimed hereinafter.

Having described the invention, what is claimed as new is:

In combination, a truck body, a trailer structure, connecting means between the trailer structure and the truck body and wheels for the trailer structure, said trailer being provided with down turned hook members, said truck body being provided with vertical sockets in which the hook members may be entered downwardly, and key means for locking the hook members to the socket structure comprising keyhole slots in said sockets extending lengthwise across the same, and angle-type keys rotatable on said members and operative under the influence of gravity to interlock with said keyhole slots.

WILLIAM S. HOWELL.